July 1, 1952 W. E. MESH 2,602,101

VARIABLE ANGLE ULTRASONIC TRANSDUCER

Filed Feb. 21, 1950

*INVENTOR.*
WILLIAM E. MESH
BY Joseph H. Lipschutz
ATTORNEY.

Patented July 1, 1952

2,602,101

UNITED STATES PATENT OFFICE 2,602,101

VARIABLE ANGLE ULTRASONIC TRANSDUCER

William E. Mesh, Brookfield, Conn., assignor to Sperry Products, Inc., Danbury, Conn., a corporation of New York Application February 21, 1950, Serial No. 145,378

5 Claims. (Cl. 171—327)

This invention relates to the inspection of objects and materials by ultrasonic vibrations. More particularly, it relates to the type of inspection wherein pulses of ultrasonic vibrations are transmitted into the object and the interval between the transmission of the pulse and the receipt of its reflection from a reflecting surface gives an indication of the presence of internal defects. In the simplest form of this method of inspection, pulses of longitudinal vibrations are transmitted into the object at right angles to the surface of the object. Parts of the object which do not lie in the direct path of these vibrations cannot be tested by this method. Thus, for example, where it is desired to test the axles of diesel locomotives where only the end of the axle is accessible, the principal portions of the axle which should be tested, i. e., the shoulders or bearing parts, would lie outside of the direct path of the longitudinal waves introduced normal to the end surface, because these bearing surfaces are of larger diameter than the end surface.

It has therefore been proposed to introduce the testing vibrations into the object at an angle to the entering surface other than normal and to vary the angle as desired. For this purpose, the electro-acoustic transducer, usually a crystal, was pivotally mounted in a liquid such as mercury confined in a container adapted to be held in firm contact with the entering surface of the object. This form of device created problems in handling and there was danger in the use of mercury.

It is therefore the principal object of this invention to provide a variable angle transducer which is easy and safe to handle and which will permit transmission of ultrasonic waves or pulses into an object at any desired angle within a predetermined range.

Other objects and advantages of this invention will become apparent in the following detailed description thereof.

In the accompanying drawings.

Figure 1:
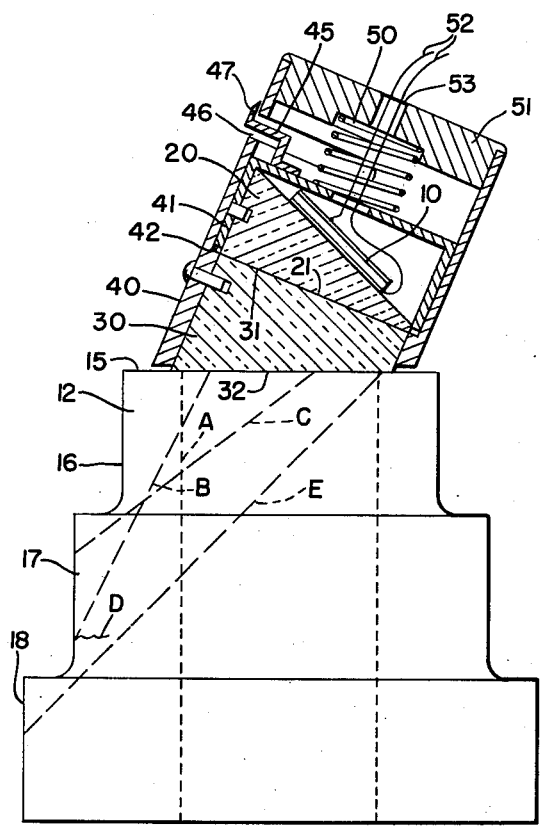
Fig. 1 is a vertical section through a variable angle transducer embodying my invention, and showing the parts in position for transmitting vibrations at a maximum angle to normal.
Figure 2:
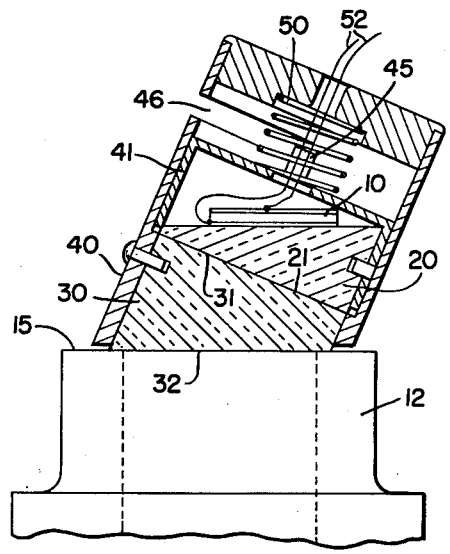
Fig. 2 is a view similar to Fig. 1 showing the parts in position for transmitting vibrations at a minimum (zero) angle to normal.

Referring to Fig. 1 there is shown an electro-acoustic transducer 10 in the form of a piezoelectric crystal adapted to be energized electrically from a suitable source of fluctuating energy to oscillate the crystal at a predetermined frequency. The crystal transforms the electrical oscillations into mechanical vibrations which are transmitted into an object 12 through an entering surface 15 thereof. The object 12 may be an axle of a diesel locomotive with a plurality of journal surfaces 16, 17, 18 of progressively increasing diameters. Under these conditions it will be seen that vibrations introduced into the object normal to surface 15, as indicated by dotted line A, will not be able to reach outer sections of portions 17 and 18, and if a defect such as D occurs in these regions it will not be possible to receive a reflection of the vibrations from D. Therefore, defects in this region will not be detected. For this reason it is desirable to transmit the crystal vibrations into the object at an angle so that they will follow a path indicated by dotted line B which will enable the vibrations to reach the outer sections of enlarged journal portions 17 and 18 and strike a defect such as D to cause reflection of the vibrations back to the sending crystal.

In the inspection of objects it is frequently desirable to vary the angle of transmission in order that the entire interior of an irregular object, such as the diesel locomotive axle shown, may be scanned. The dotted lines A, B, C and E indicate the variety of angles which must be employed in the inspection of such object. To permit the scanning of an object through a wide angular range, I mount the crystal 10 on a wedge assembly comprising two wedge sections, an upper section 20 and a lower section 30. The sections are formed of a vibration conducting material such as Plexiglas. The base 21 of upper wedge section 20 rests upon base 31 of lower wedge section 30 and is rotatable thereon. The inclined surface 22 makes an angle $\alpha$ with respect to its base 21 while the inclined surface 32 makes an angle $\beta$ with respect to its base 31. In the positions shown in Fig. 1 the angles $\alpha$ and $\beta$ are additive to provide a total maximum angle $\theta$ for the wedge assembly. However, as the upper wedge section 20 rotates about an axis normal to the meeting faces 21 and 31, the angle of the wedge assembly diminishes, i. e., the further it is turned from the Fig. 1 position the greater is the angle which is subtracted from $\theta$. By turning section 20 through 180°, a minimum wedge assembly angle is obtained, and, if $\alpha$ is equal to $\beta$, the wedge assembly angle is zero and the vibrations are transmitted normally to the surface 15. Thus, by merely turning wedge section 20 on wedge section 30, any desired angle of transmission between 0° and θ can be obtained.

Figure 3:
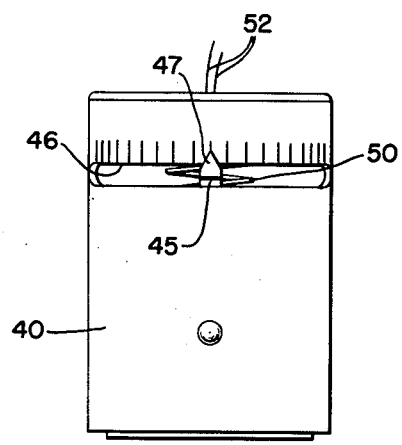
Fig. 3 is a front elevation.

In actual construction, the wedge section 30 may be fixed in the lower end of a casing 40 and so positioned that wedge face 32 projects beyond the lower edge of the casing. The upper wedge section 20 may be fixed in a casing 41 and projects beyond the casing. The bearing surface is the interface 21 and 31. A film of oil may be used as a couplant at the interface. A spring 50 may be interposed between a cover or closure 51 and casing 41 to maintain the wedges in coupled position. The electrical connections 52 to the crystal are shown extending through an opening 53 in the cover. For rotating the ring upon its bearing, a projection 45 fixed to the ring may extend through an arcuate slot 46 in the casing. The projection may terminate in a pointer 47 which can cooperate with a scale on the casing (see Fig. 3) to give an indication of angle θ.

Having described my invention, what I claim and desire to secure by Letters Patent is:

1. A device for transmitting ultrasonic vibrations into an object through an entering surface thereof and receiving vibrations therefrom at angles of incidence and reflection greater than zero, comprising a piezo-electric crystal, a pair of vibration transmitting wedges, each wedge comprising a base and a surface inclined to the base, means for mounting said wedges with their bases in contact, said crystal being mounted on the inclined face of one of the wedges, the inclined face of the other wedge being adapted to engage the entering surface of the object, and means for relatively rotating said wedges on their contacting bases whereby the angles of incidence and reflection of the vibrations may be varied throughout the relative rotation of said wedges.

2. A device for transmitting ultrasonic vibrations into an object through an entering surface thereof and receiving vibrations therefrom at angles of incidence and reflection greater than zero, comprising a piezo-electric crystal, a pair of vibration transmitting wedges, each wedge comprising a base and a surface inclined to the base, the angles of inclination of the surfaces of the wedges being equal, means for mounting said wedges with their bases in contact, said crystal being mounted on the inclined face of one of the wedges, the inclined face of the other wedge being adapted to engage the entering surface of the object, and means for relatively rotating said wedges on their contacting bases, whereby the angle of transmission will vary from zero to twice said angle of inclination in a relative rotation of said wedges through 180° whereby the angles of incidence and reflection of the vibrations may be varied throughout the relative rotation of said wedges.

3. A device for transmitting ultrasonic vibrations into an object through an entering surface thereof and receiving vibrations therefrom at angles of incidence and reflection greater than zero, comprising a piezo-electric crystal, a pair of vibration transmitting wedges, each wedge comprising a base and a surface inclined to the base, means for mounting said wedges with their bases in contact, said crystal being mounted on the inclined face of one of the wedges, the inclined face of the other wedge being adapted to engage the entering surface of the object, and means for relatively rotating said wedges on their contacting bases, said last-named means comprising a casing, means for supporting one of said wedges fixedly in said casing, and means for supporting the other wedge rotatably in said casing whereby the angles of incidence and reflection of the vibrations may be varied throughout the relative rotation of said wedges.

4. A device for transmitting ultrasonic vibrations into an object through an entering surface thereof and receiving vibrations therefrom at angles of incidence and reflection greater than zero, comprising a piezo-electric crystal, a pair of vibration transmitting wedges, each wedge comprising a base and a surface inclined to the base, means for mounting said wedges with their bases in contact, said crystal being mounted on the inclined face of one of the wedges, the inclined face of the other wedge being adapted to engage the entering surface of the object, and means for relatively rotating said wedges on their contacting bases said last-named means comprising a casing, means for supporting one of said wedges fixedly in said casing, means for supporting the other wedge rotatably in said casing, said casing having an opening therein, and said rotatable supporting means having a projection extending through said opening whereby the rotatable wedge may be rotated whereby the angles of incidence and reflection of the vibrations may be varied throughout the relative rotation of said wedges.

5. A device for transmitting ultrasonic vibrations into an object through an entering surface thereof and receiving vibrations therefrom at angles of incidence and reflection greater than zero, comprising a piezo-electric crystal, a pair of vibration transmitting wedges, each wedge comprising a base and surface inclined to the base, means for mounting said wedges with their bases in contact, said crystal being mounted on the inclined face of one of the wedges, the inclined face of the other wedge being adapted to engage the entering surface of the object, and means for relatively rotating said wedges on their contacting bases, said last-named means comprising a casing, means for supporting one of said wedges fixedly in said casing, means for supporting the other wedge rotatably in said casing, said casing having an arcuate slot therein and a scale cooperating with said slot and calibrated in angular degrees, and said rotatable supporting means having a projection extending through said slot and cooperating with said scale whereby the rotatable wedge may be rotated and its angle of transmission indicated on said scale whereby the angles of incidence and reflection of the vibrations may be varied throughout the relative rotation of said wedges.

WILLIAM E. MESH.

REFERENCES CITED

The following references are of record in the file of this patent:

UNITED STATES PATENTS

| Number | Name | Date |
|---|---|---|
| 2,155,661 | Jeffree | Apr. 25, 1939 |
| 2,377,827 | Tenenbaum | June 5, 1945 |
| 2,463,328 | Sproule | Mar. 1, 1949 |
| 2,505,867 | Meunier | May 2, 1950 |